April 15, 1924.    1,490,657
J. BOTELLA
MANUFACTURE OF CARRIAGE BODIES FOR MOTOR VEHICLES
Filed March 8, 1922    2 Sheets-Sheet 1

Inventor
J. Botella,
By Marks Clerk
Attys.

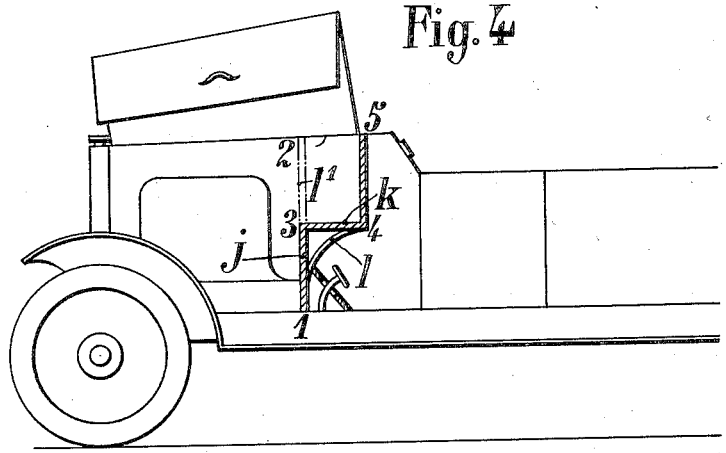
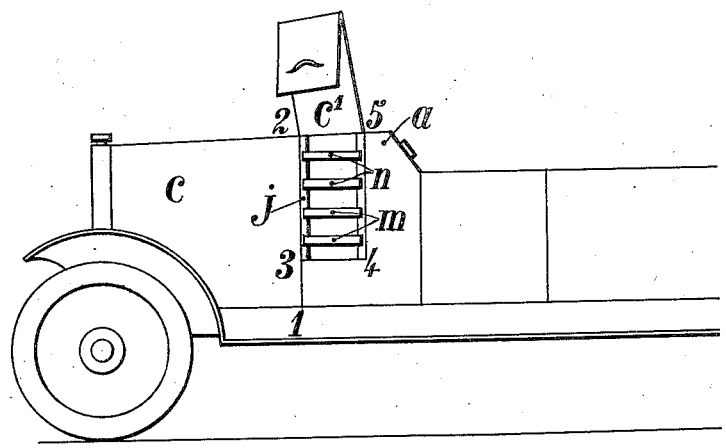

Patented Apr. 15, 1924.

1,490,657

UNITED STATES PATENT OFFICE.

JACQUES BOTELLA, OF PARIS, FRANCE.

MANUFACTURE OF CARRIAGE BODIES FOR MOTOR VEHICLES.

Application filed March 8, 1922. Serial No. 542,091.

*To all whom it may concern:*

Be it known that I, JACQUES BOTELLA, a citizen of the French Republic, residing at 3 Rue Georges Ville, Paris, France, have invented new and useful Improvements in the Manufacture of Carriage Bodies for Motor Vehicles, of which the following is a specification.

This invention relates to improvements in the manufacture of carriage bodies for motor vehicles and consists in utilizing the space under the cowl, and between the dash board and the instrument board carrying the control apparatuses, etc., for arranging a tool chest therein.

The fixed cowl covering this space is reduced in size so as to permit of ready access to this tool chest by simply opening either side of the elongated hood covering the engine. In this way, in case of need, the tools are accessible and within reach of the hand, during the repairs of the engine, without inconveniencing the driver or mechanic by having to look under the cushions or elsewhere for the tool bags now generally used.

These improvements thus permit of the utilization of the space indicated by its location and which had not been previously employed for any useful purpose, owing to its inaccessibility. On the other hand, there is necessitated the utilization of a rather long hood resulting in a more elegant line of the front part of the car, particularly with the actual use of very high radiators. The said improvements have also the advantage of obviating the unesthetic chests which are usually arranged in the foot boards.

Various forms of carrying out the improvements forming the subject-matter of the present invention are illustrated, by way of example, in the accompanying drawing, in which:

Fig. 4 shows in vertical section, with the hood open a modification of the arrangement illustrated in Fig. 3.

Fig. 5 is a similar view showing a third form of execution which permits of utilizing the existing dash boards and hoods by the addition of a secondary hood or door on the cowl which permits of access to the space used.

Figure 1:
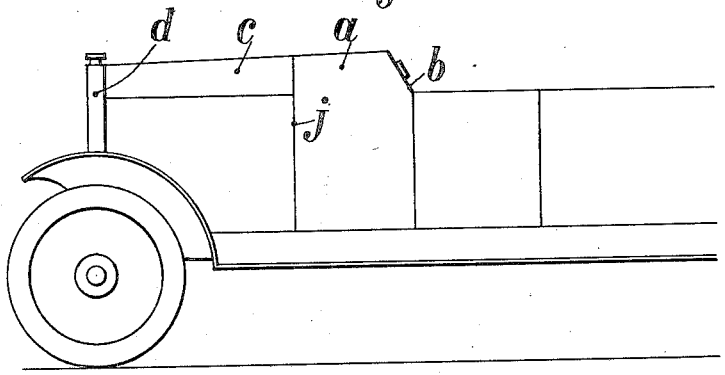
Fig. 1 shows in elevation the front part of a motor car before the transformation according to the invention.
Figure 3:
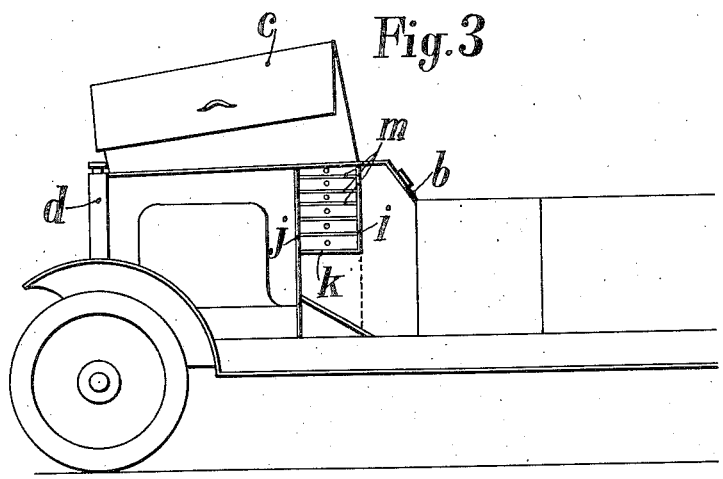
Fig. 3 is a vertical section, with the hood open, corresponding to Fig. 2.

The fixed cowl $a$, Fig. 1, which covers the space between the dash board $j$ and the board $b$ is shortened up to the second dashboard $i$, Fig. 3, thus covering only the portion $i-b$.

The dash board $i$ which extends downwardly a sufficient distance and does not hinder access to the pedals, is connected to the dash board $j$ by a floor $k$, thus forming a chest accessible from either side of the vehicle and having three walls $j$, $k$, $i$. The hood $c$ which covers the engine in Fig. 1 between the parts $d$ and $j$ is extended upwardly to the dash board $i$ for covering at the same time the chest.

This chest may be fitted internally in any desired manner. Small shelves may be, for instance, superposed therein, the tools being arranged on these shelves in recesses, and secured in the said recesses by means of straps or flanges for avoiding the vibrations and thereby considerably reducing noise. These shelves may slide in grooves provided in the walls $j$ and $i$.

Figure 2:
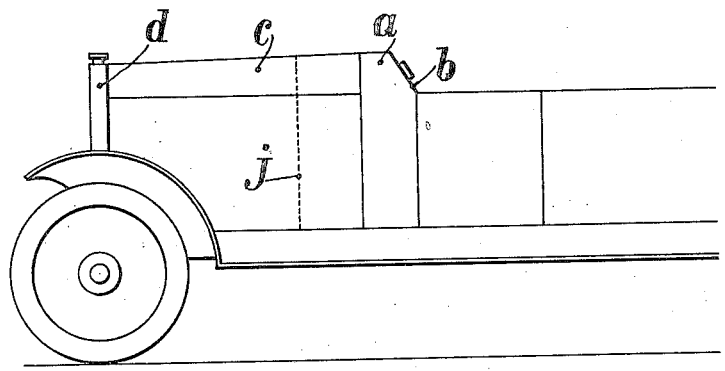
Fig. 2 is a similar view but after transformation according to the invention.

The hood $c$ as shown in Fig. 2 covers all the front part of the vehicle, and constitutes a closure for the chest as well as for the engine. Access to both parts is obtained by raising one of the two sides of the hood in the known manner.

Figs. 4 and 5 illustrate constructional modifications of the improvements already described.

In Fig. 4, the dash board $j$ instead of extending upwardly in the known manner from 1 up to 2 is constructed according to the profile 1, 3, 4, 5, in Fig. 3. This dash board may be made of moulded aluminium and the bottom $k$ which is integral with the same is strengthened by means of brackets $l$ cast with the dash board.

The bottom $k$ may thus support a removable tool chest which occupies the space 2—3—4—5— and is held in place by means of any suitable device, such as, for instance fastening members secured at their respective ends as shown at 3 and 5.

If it is desired to use a fixed or stationary chest, the dash board is provided with a front wall $1'$ cast with the same and extending upwardly from 3 to 2. The grooves $n$ (Fig. 5) are provided at opposite points of adjacent faces of the dash board and cowl for slidably receiving shelves m.

Instead of extending the hood c up to the cowl a, in order to cause it to close the tool chest, it may terminate at j and a second small independent hood c may be provided, this second hood covering the tool chest and permitting of access thereto through its lateral portion which may be raised in the same manner as the main hood c; or a door pivoted on a hinge at 3, 4 may be provided.

If the arrangement illustrated in Fig. 4 is adopted, the dash board may be modified by the manufacturer of the chassis, so as to permit the construction of the tool chest without interfering with the electric wires or to the control apparatuses which are usually fitted in a permanent manner by the manufacturer of the chassis.

What I claim as my invention and desire to secure by Letters Patent is:

1. In a motor vehicle, in combination, a body, an instrument board therein, a main dash board positioned forwardly of the instrument board and transversely of the vehicle, a secondary dash board arranged transversely in the body between the main dash board and the instrument board, a cowl supporting the instrument board and terminating parallel with the secondary dash board, a horizontally disposed transverse partition between the main and secondary dash boards, a tool chest arranged between the main and secondary dash boards and above the horizontal partition and an elongated hood arranged forwardly of the cowl and acting as a cover for the tool chest.

2. An arrangement as claimed in claim 1 wherein the tool chest includes a plurality of horizontally disposed and spaced sliding elements accessible at both sides of the vehicles.

3. An arrangement as claimed in claim 1 wherein the hood is formed in sections extending transversely of the vehicle.

In testimony whereof I have signed my name to this specification.

JACQUES BOTELLA.